(12) United States Patent
Lee

(10) Patent No.: US 7,695,292 B2
(45) Date of Patent: Apr. 13, 2010

(54) COMPLEX INPUT/OUTPUT PORT CONNECTOR

(75) Inventor: Ming-Lung Lee, Sinjhuang (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 43 days.

(21) Appl. No.: 12/076,042

(22) Filed: Mar. 13, 2008

(65) Prior Publication Data
US 2009/0182905 A1   Jul. 16, 2009

(30) Foreign Application Priority Data
Jan. 11, 2008   (TW) .............................. 97200693 U

(51) Int. Cl.
   *H01R 25/00*   (2006.01)
(52) U.S. Cl. .................... 439/110; 439/540.1
(58) Field of Classification Search ................ 439/700, 439/639, 540.1, 110–112
See application file for complete search history.

(56) References Cited

U.S. PATENT DOCUMENTS

| | | | | |
|---|---|---|---|---|
| 1,584,167 A | * | 5/1926 | Camfield | .................... 439/736 |
| 5,094,623 A | * | 3/1992 | Scharf et al. | ................. 439/101 |
| 5,154,628 A | * | 10/1992 | Skegin | ........................ 439/336 |
| 5,418,328 A | * | 5/1995 | Nadeau | ...................... 174/494 |
| 5,745,338 A | * | 4/1998 | Bartolo et al. | .............. 361/637 |
| 5,980,288 A | * | 11/1999 | Jarvis | ......................... 439/188 |
| 6,484,997 B1 | * | 11/2002 | Edwards et al. | ........ 248/223.41 |
| 6,848,951 B1 | * | 2/2005 | Bechaz et al. | ............... 439/716 |
| 7,408,766 B2 | * | 8/2008 | Oesterhaus et al. | ......... 361/624 |
| 7,438,566 B2 | * | 10/2008 | Chen | .......................... 439/110 |

FOREIGN PATENT DOCUMENTS

GB   2166914 A   *   5/1986

* cited by examiner

*Primary Examiner*—Michael C Zarroli
(74) *Attorney, Agent, or Firm*—Rabin & Berdo, P.C.

(57) ABSTRACT

A complex input/output port connecter is applied in an electronic device and electrically connected with at least an input/output module. The electrical connecter includes a frame and a plurality of signal lines. The frame accommodates at least one input/output module. The signal lines are arranged on one side of the frame in a direction perpendicular to an assembly direction of the input/output module and electrically connected with a circuit board of the electronic device. The input/output modules are installed within the frame freely according to usage requirements and electrically contact the corresponding signal lines to form an electrical connection.

5 Claims, 5 Drawing Sheets

COMPLEX INPUT/OUTPUT PORT CONNECTOR

CROSS-REFERENCE TO RELATED APPLICATIONS

This non-provisional application claims priority under 35 U.S.C. §119(a) on Patent Application Ser. No(s). 097200693 filed in Taiwan, R.O.C. on Jan. 11, 2008, the entire contents of which are hereby incorporated by reference.

BACKGROUND OF THE INVENTION

1. Field of Invention

The present invention relates to an electrical connecter, and more particularly to a complex input/output port connecter.

2. Related Art

Nowadays, with the continuous and vigorous development of technologies, computer equipments have become popularized. The computer equipments currently available on the market, no matter personal computers (PC) or notebooks, must be electrically connected with a computer peripheral device, for example, a display screen, a projector, a printer, a keyboard, a mouse, a speaker, etc. through an electrical connection port, such that the peripheral device performs default functions.

A general electrical connection port is fixed on a back plate of a computer equipment and electrically connected with a motherboard, so as to achieve the electrical signal communication between the motherboard and a peripheral device electrically inserted in the connection port Conventional electrical connection ports are fixed and standard components, and cannot be replaced or added/removed by a user at will. If the types and amount of the electrical connection ports cannot meet the usage requirements, the user must have the motherboard replaced by another one that meets the usage requirements, which is an additional cost burden to the user. Besides, the discarded motherboard in good conditions for the replacement of the electrical connection ports causes a waste of resources.

A chassis of the computer with replaceable output/input modules is disclosed in the prior art. The chassis is opened with a slot on a back plate thereof and has a connecter socket on a motherboard. The output/input modules are moveably installed in the slot in conformity with the individual user's demands for choosing a desired output/input module. Manufacturers also reveal a concept of a detachable assembly structure for the input/output ports and the motherboard. First, the separate input/output ports are installed into a chassis. Then, the motherboard is fixed by breaches and barbs on edges of the chassis to achieve the electrical connection between the motherboard and the input/output ports.

In addition, another type of connection interface module is disclosed in the conventional art. The connection interface module includes a plurality of connection interfaces of different specifications and a distribution connecter. One end of the connection interfaces is provided with a joint and the other end is connected to the distribution connecter. The user may select a corresponding connection interface according to a connection terminal of the peripheral device to achieve the electrical connection.

Although the concept that the electrical connection port and the motherboard are separated is disclosed in the above examples, the electrical connection ports are still configured with a plurality of input/output modules. If one of the input/output modules does not meet the user's demands or is damaged, the whole set of electrical connection ports is still required to be replaced, which is inconvenient in actual use.

SUMMARY OF THE INVENTION

In view of the above problems, the present invention provides a complex input/output port connecter, to solve the problem in the conventional electrical connection ports are fixed on the back plate of the chassis and the input/output modules are fixed within the electrical connection ports, the user must replace the whole set of motherboard or electrical connection ports.

The complex input/output port connecter of the present invention is electrically connected with a circuit board of an electronic device. The complex input/output port connecter is electrically connected with at least an input/output module that has a plurality of electrical contacts.

The complex input/output port connecter includes a frame and a plurality of signal lines. The frame has an accommodation space inside and is provided with an opening on a front side thereof for multiple the input/output modules to be installed therein. The input/output modules are installed at any position within the frame from the opening towards an assembly direction. The plurality of signal lines are arranged on one side of the frame and electrically connected with the circuit board. An arrangement direction of the signal lines is perpendicular to the assembly direction of the input/output modules so as to electrically contact the electrical contacts of the input/output modules to form an electrical connection.

The advantage of the present invention lies in that the signal lines are arranged in the direction perpendicular to the assembly direction of the input/output modules, so that the input/output modules may be installed at any position within the frame freely, so as to achieve a sustained electrical contact between the electrical contacts of the input/output modules and the corresponding signal lines. In this manner, the actually required input/output modules may be selected and replaced freely, thereby greatly improving the efficiency of use of the electrical connecter.

BRIEF DESCRIPTION OF THE DRAWINGS

The present invention will become more fully understood from, the detailed description given herein below for illustration only, and thus are not limitative of the present invention, and wherein.

DETAILED DESCRIPTION OF THE INVENTION

The complex input/output port connecter of the present invention is applied in an electronic device which likes a computer device having input/output ports, such as a PC, a notebook computer, and a tablet PC, but not limit to the above-mentioned computer devices. In the following detailed description of the present invention, the PC is taken as a preferred embodiment of the present invention. However, the accompanying drawings are provided for reference but not intended to limit the scope of the present invention.

Figure 1:
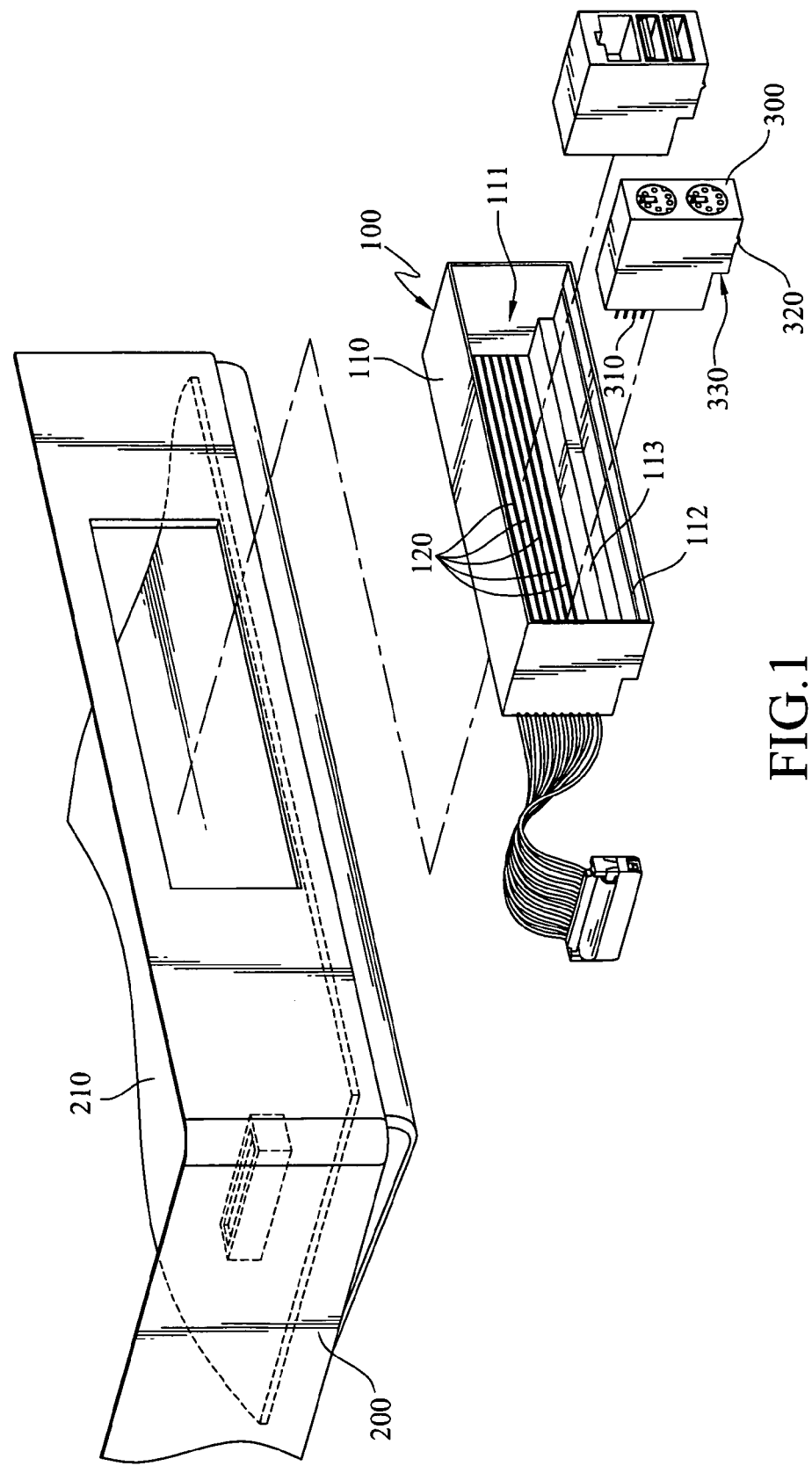
FIG. 1 is an exploded view of a first embodiment of the present invention.
Figure 2:
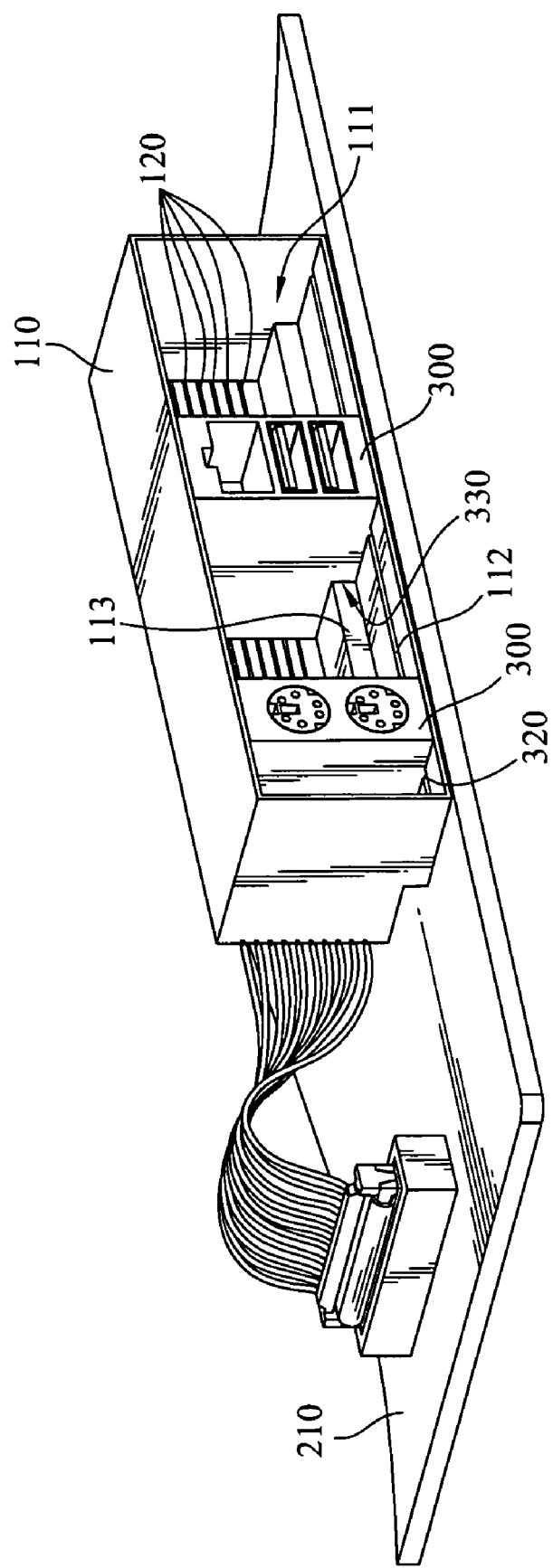
FIG. 2 is a perspective view of the first embodiment of the present invention.

FIGS. 1 and 2 are schematic views of a first embodiment of the present invention. The complex input/output port connecter 100 of the present invention is applied in an electronic device 200. The electronic device 200 has a circuit board 210. The complex input/output port connecter 100 may be electrically connected with at least an input/output module 300 having a plurality of electrical contacts 310 on a back side thereof.

The input/output modules 300 disclosed in the present invention may be an electrical connection module, such as an adaptor (PS/2) module, a universal serial bus (USB) module, an video graphic card (VGA) module, or a mobile disk (SATA) connection module, externally connected to a computer peripheral device (not shown). Although the PS/2 module and USB module are described for illustration, those skilled in the art may add or reduce the types and number of the input/output modules according to the actual requirements, which is not limited thereto.

Please refer to FIGS. 1 and 2, the complex input/output port connecter 100 of the present invention includes a frame 110 and a plurality of signal lines 120. The frame 110 has an accommodation space inside and is provided with an opening 111 on a front side thereof. The input/output modules 300 are installed within the frame 110 from the opening 111 towards an assembly direction. The plurality of signal lines 120 represent default signals respectively, and are, for example, data lines, GND lines, CLK lines, VCC lines, etc. The signal lines 120 respectively having default signal are arranged at a distance from each other on a rear side of the frame 110 and electrically connected with the circuit board 210. Furthermore, an arrangement direction of the single lines 120 is perpendicular to the assembly direction of the input/output modules 300, so as to electrically contact the electrical contacts 310 of the input/output modules 300.

In addition, the frame 110 has a slide rail 112 recessed into a bottom side on the inner wall thereof and a slide block 320 corresponding to the slide rail 112 is raised on a bottom side of the input/output modules 300. The frame 110 is provided with a stopper 113 on the rear side on the inner wall thereof and the input/output module 300 is provided with an urging portion 330 in a shape corresponding to the stopper 113 on the back side.

Referring to FIGS. 1 and 2, the required input/output module 300 may be installed at any position within the frame 110 from the opening 111 by the user according to the actual requirements. The urging portion 330 of the input/output module 300 leans against the stopper 113 of the frame 110, such that the electrical contacts 310 exactly electrically contact the signal lines 120, thereby avoiding the damage caused by a direct impact of the electrical contacts 310 on the signal lines 120 due to the too large installing force during the installation of the input/output module 300.

The input/output module 300 is embedded within the slide rail 112 of the frame 110 through the slide block 320, such that the input/output module 300 is slidable within the frame 110 to a use position. Since the plurality of signal lines 120 are parallel with the sliding direction of the input/output module 300, the electrical contacts 310 of the input/output module 300 maintain sustained electrical contact with the corresponding signal lines 120, so as to form an electrical connection.

Figure 3:
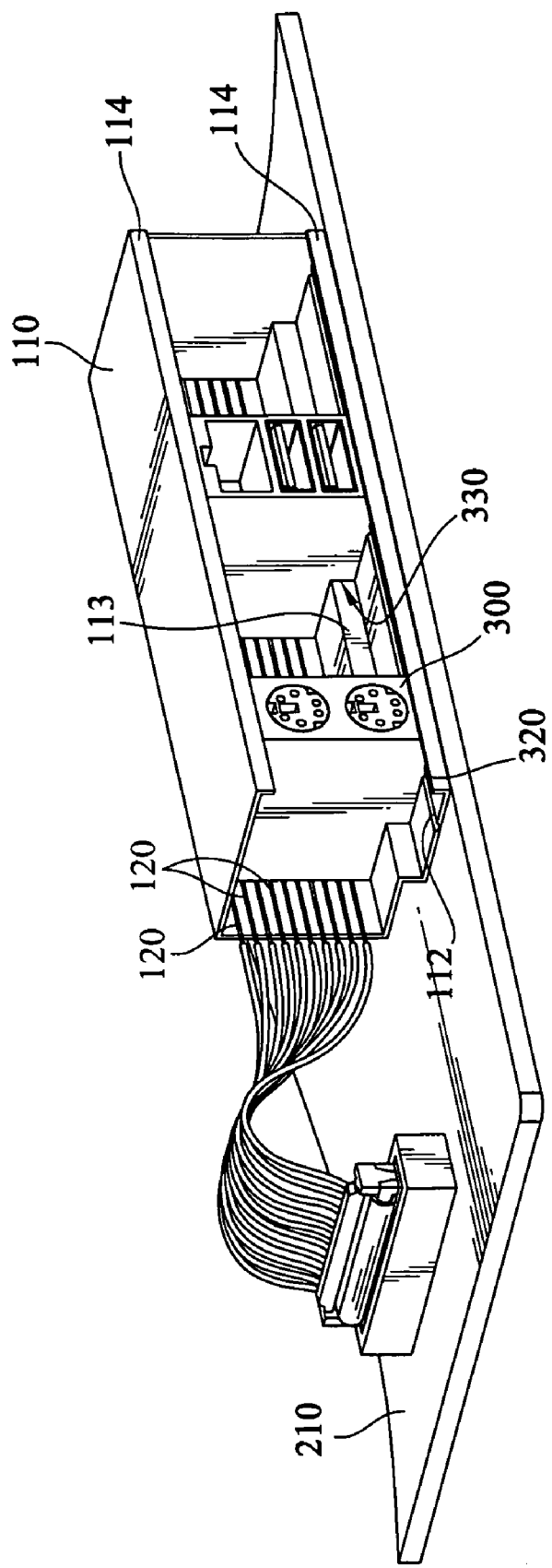
FIG. 3 is a perspective view of a second embodiment of the present invention.

FIG. 3 is a schematic view of a second embodiment of the present invention. As shown in the figure, the frame 110 of the present invention may also be provided with another opening 111 on a side edge of the frame 110 for an installation of the input/output module 300 from the side edge of the frame 110 in addition to the opening 111 on the front side of the frame 110. In the second embodiment, the frame is further provided with a limit portion 114 respectively on two opposite upper and lower side edges of the front side to limit a sliding range of the input/output module 300 within the frame 110, thereby avoiding the detachment of the input/output module 300 from the frame 110 to causes the interruption of the electrical contact with the signal lines 120.

Figure 4:
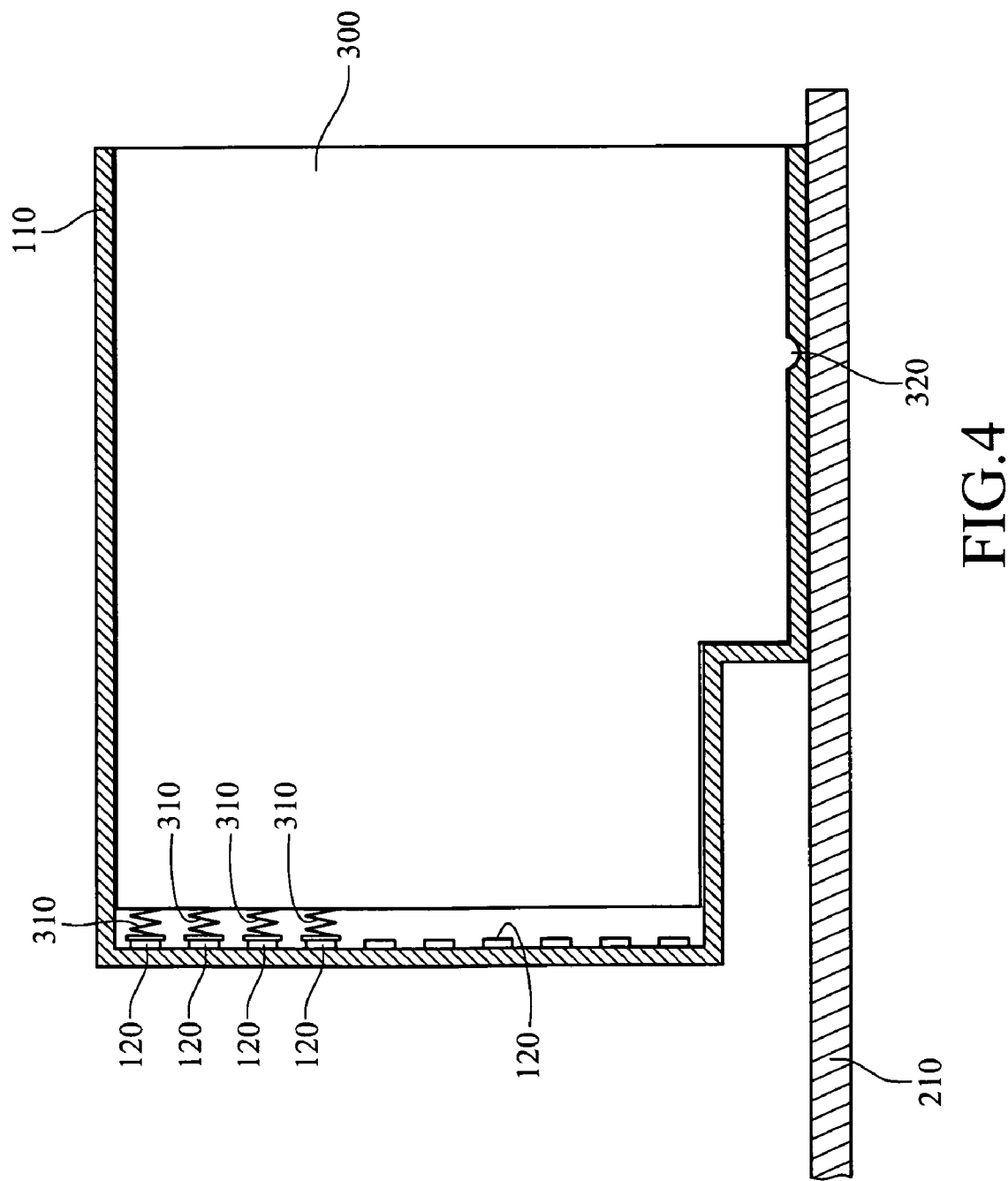
FIG. 4 is a side view of electrical contacts of different forms of the present invention.
Figure 5:
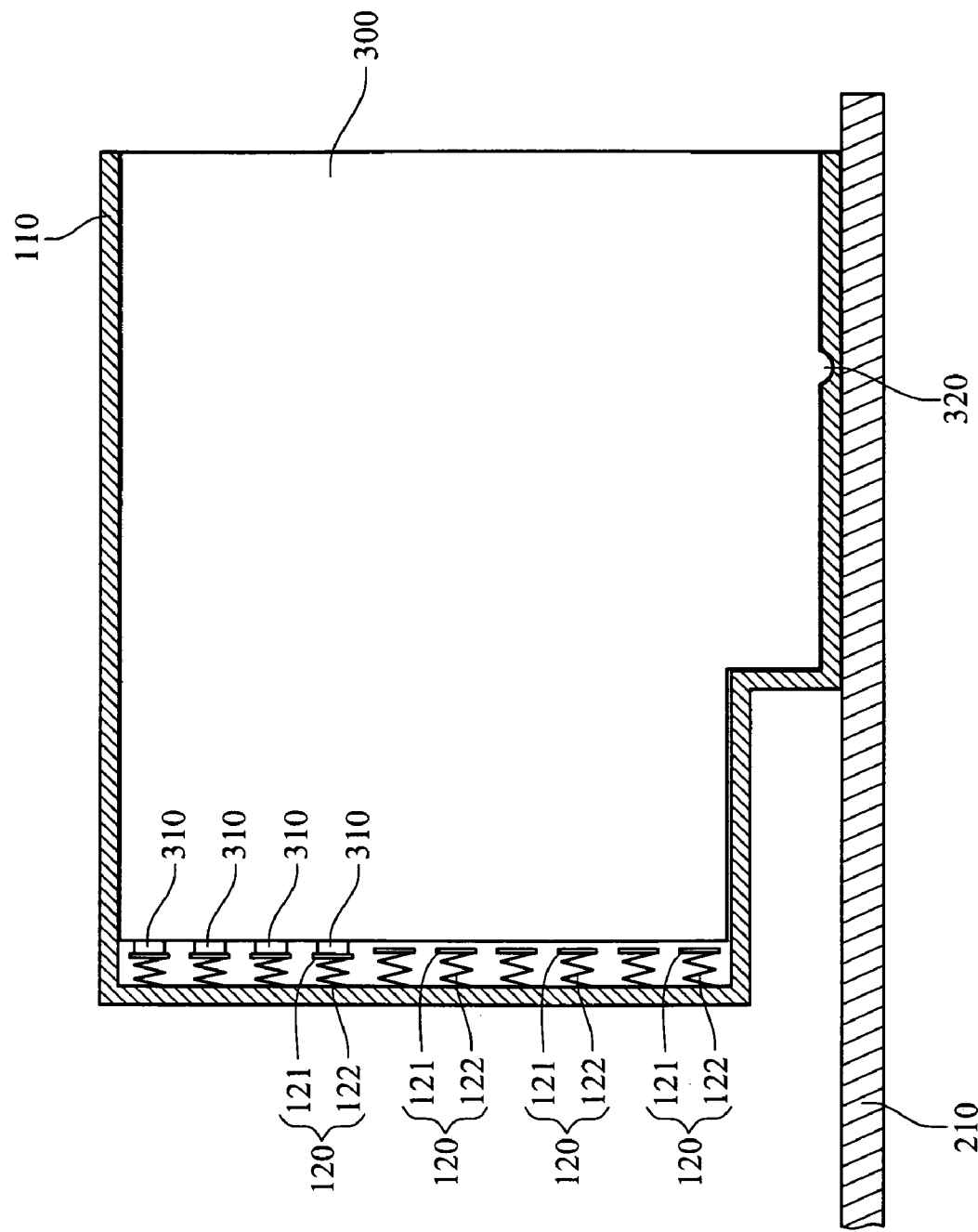
FIG. 5 is a side view of signal lines of different forms of the present invention.

FIGS. 4 and 5 are side views of electrical contact of different forms of the present invention. In additional to the pin form of the above embodiment, the electrical contacts 310 of the input/output module 300 disclosed in the present invention may also be designed to be a flat spring structure. The flat spring may be compressed and has the elasticity, thereby improving the stability of the contact with the signal lines 120 and avoiding the interruption of the electrical connection between the input/output module 300 and the signal lines 120 due to the impact of external forces. Alternatively, the signal lines 120 are designed to be constituted of a strip of a sheet metal 121 and a spring 122. The spring 122 is supported against a rear side of the strip of the sheet metal 121 to push the sheet metal 121 to electrically contact the electrical contacts 310 of the input/output module 300, thereby improving the stability of the contact between the electrical contacts 310 and the single lines 120.

The complex input/output port connecter of the present invention can select to install input/output modules of different types into the frame according to the actual demands of the user and replace the input/output modules at any time. Furthermore, the signal lines arranged in the direction perpendicular to the assembly direction of the input/output modules enable the input/output modules to be installed at any position within the frame freely and maintain the sustained electrical contact with the corresponding signal lines, thereby greatly improving the efficiency of use of the electrical connecter.

What is claimed is:

1. A complex input/output port connecter, electrically connected with a circuit board of an electronic device, and the complex input/output port connecter being electrically connected with at least an input/output module having a plurality of electrical contacts, the complex input/output port connecter comprising:
   a frame, having an accommodation space inside and being provided with an opening for the input/output module to be installed therein, wherein the input/output module is installed at any position within the frame from the opening towards an assembly direction; and
   a plurality of signal lines, arranged on one side of the frame and electrically connected with the circuit board, each of the signal lines having a strip of a sheet metal and a spring disposed between the strip of the sheet metal and the frame, wherein an arrangement direction of the signal lines is perpendicular to the assembly direction of the input/output module, so as to electrically contact the electrical contacts of the input/output module upon an insertion of the input/output module into the frame;
   wherein the input/output module is installed within the frame freely according to a usage requirement and electrically contacts the signal lines via the electrical contacts to form an electrical connection.

2. The complex input/output port connecter as claimed in claim 1, wherein the frame has a slide rail formed on an inner wall thereof, and the input/output module has a slide block at a position corresponding to the slide rail, such that, when the input/output module is inserted into the frame, the slide rail accommodates the slide block, so as to allow the input/output module to slide along the slide rail within the frame.

3. The complex input/output port connecter as claimed in claim 1, wherein the frame has a stopper formed on an inner wall thereof, and the input/output module is provided with an urging portion that leans against the stopper, so that the electrical contacts to exactly electrically contact the signal lines.

4. The complex input/output port connecter as claimed in claim 1, wherein the frame is provided with a limit portion on one side thereof for limiting a displacement of the input/output module within the frame.

5. The complex input/output port connecter as claimed in claim 1, wherein a structure of the electrical contact is a flat spring structure.

* * * * *